United States Patent
Tian et al.

(10) Patent No.: US 10,496,089 B2
(45) Date of Patent: Dec. 3, 2019

(54) AIRCRAFT CONTROL DEVICE AND REMOTE CONTROL AIRCRAFT

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 145 days.

(21) Appl. No.: 15/687,266

(22) Filed: Aug. 25, 2017

(65) Prior Publication Data
US 2018/0011486 A1    Jan. 11, 2018

(30) Foreign Application Priority Data
Dec. 28, 2016 (CN) .......................... 2016 1 1237846

(51) Int. Cl.
| | | |
|---|---|---|
| G05D 1/02 | (2006.01) | |
| H04B 1/00 | (2006.01) | |
| B64C 39/02 | (2006.01) | |
| H04B 1/10 | (2006.01) | |
| G05D 1/10 | (2006.01) | |
| G05D 1/00 | (2006.01) | |

(52) U.S. Cl.
CPC ......... *G05D 1/0022* (2013.01); *B64C 39/024* (2013.01); *G05D 1/0077* (2013.01); *G05D 1/0094* (2013.01); *H04B 1/006* (2013.01); *H04B 1/10* (2013.01); *B64C 2201/146* (2013.01); *G05D 1/0038* (2013.01); *G05D 1/101* (2013.01)

(58) Field of Classification Search
CPC .... G05D 1/0022; G05D 1/101; G05D 1/0038; H04B 1/006; B64C 39/024; B64C 2201/146
See application file for complete search history.

(56) References Cited

U.S. PATENT DOCUMENTS

| | | | | |
|---|---|---|---|---|
| 2013/0248656 A1* | 9/2013 | Mohamadi | ............ | H04W 16/26 244/190 |
| 2015/0232181 A1* | 8/2015 | Oakley | ................. | B64C 39/024 701/2 |
| 2016/0124428 A1* | 5/2016 | Nutaro | ................. | G05D 1/0011 701/2 |
| 2017/0069214 A1* | 3/2017 | Dupray | ................. | G08G 5/0021 |
| 2018/0312276 A1* | 11/2018 | Miller | .................... | B64F 1/125 |

* cited by examiner

*Primary Examiner* — Yonel Beaulieu
*Assistant Examiner* — Martin A Weeks

(57) ABSTRACT

An aircraft control device and a remote controller aircraft are disclosed. The aircraft control device includes a first channel configured to receive first control information outputted by a remote controller and transmit the first control information to an aircraft; a second channel configured to receive second control information outputted by the remote controller and transmit the second control information to a camera and/or a gimbal; and a switch unit configured to switch that the first control information is received by the second channel and transmitted to the aircraft when the first channel is disturbed or a distance between the remote controller and the aircraft is larger than a distance threshold. The present invention is able to switch the transmission route of the first control information between the first channel and the second channel in accordance with situations of the first channel and the second channel.

20 Claims, 2 Drawing Sheets

AIRCRAFT CONTROL DEVICE AND REMOTE CONTROL AIRCRAFT

CROSS REFERENCE OF RELATED APPLICATION

The present invention claims priority under 35 U.S.C. 119(a-d) to CN 201611237846.2, filed Dec. 28, 2016.

BACKGROUND OF THE PRESENT INVENTION

Field of Invention

The present invention relates to a field of aircraft control, and more particularly to an aircraft control device and a remote control aircraft.

Description of Related Arts

At present, the remote controller is usually used to control the flight of the aircraft. The control information outputted by the remote controller is transmitted to the aircraft through a single channel (such as 2.4 G wifi channel), and then the aircraft performs the received control information to complete the flight. The drawback of this approach is that the aircraft will not be able to receive the control information once the channel for transmitting the control information has a problem, such as when the channel is disturbed or the distance between the aircraft and the remote controller is out of the transmission distance of the channel, the aircraft is unable to be controlled by the remote controller; at this time, the aircraft flight will be a great risk, and the aircraft is easy to be damaged, or even crashed.

SUMMARY OF THE PRESENT INVENTION

A technical problem to be solved of the present invention is to provide an aircraft control device and a remote control aircraft, so as to overcome a deficiency in the prior art that a remote controller is unable to control an aircraft when a single-channel has a problem caused by adopting the single-channel to transmit the control information of the aircraft.

The present invention solves the above technical problem through technical solutions as follows.

An aircraft control device comprises:

a first channel configured to receive first control information outputted by a remote controller and transmit the first control information to an aircraft;

a second channel configured to receive second control information outputted by the remote controller and transmit the second control information to a camera and/or a gimbal; and a switch unit configured to switch that the first control information is received by the second channel and transmitted to the aircraft when the first channel is disturbed or a distance between the remote controller and the aircraft is larger than a distance threshold.

In this solution, the first control information is no longer transmitted to the aircraft through the single first channel; and when the first channel has a problem, the second channel is taken as a redundant control, and the first control information is transmitted to the aircraft through the second channel, so as to ensure that the remote controller continuously controls the aircraft to avoid damage to the aircraft.

Preferably, the switch unit is also configured to determine whether the first channel is disturbed through judging an amount of the first control information received by the first channel in a first time period.

Preferably, determining whether the first channel is disturbed through judging the amount of the first control information received by the first channel in the first time period comprises: if the amount of the first control information received by the first channel in the first time period is smaller than a first amount threshold, determining that the first channel is disturbed, otherwise determining that the first channel is not disturbed.

Preferably, the switch unit is also configured to start an autonomous flight mode when the first control information is received by the second channel and transmitted to the aircraft through switching, and the second channel is disturbed; the autonomous flight mode is configured to control the aircraft to fly back to a takeoff point and land.

In this solution, it is avoided that when the aircraft is disturbed in the second channel, the aircraft is in an uncontrolled state due to unable to receive the first control information, so as to ensure the flight safety of the aircraft.

Preferably, the switch unit is also configured to detect whether the second channel is disturbed during starting the autonomous flight mode; wherein if the second channel is disturbed, the autonomous flight mode is continued, otherwise it is restored that the first control information is received by the second channel and transmitted to the aircraft.

In this solution, it is timely restored that the remote controller controls the aircraft.

Preferably, the switch unit is also configured to determine whether the second channel is disturbed through judging an amount of the first control information received by the second channel in a second time period, an amount of the second control information received by the second channel in the second time period, or a total amount of the first control information and the second control information received by the second channel in the second time period.

Preferably, determining whether the second channel is disturbed through judging the amount of the first control information received by the second channel in the second time period, the amount of the second control information received by the second channel in the second time period, or the total amount of the first control information and the second control information received by the second channel in the second time period, comprises:

if the amount of the first control information received by the second channel in the second time period, the amount of the second control information received by the second channel in the second time period, or the total amount of the first control information and the second control information received by the second channel in the second time period, is smaller than a second amount threshold, determining that the second channel is disturbed, otherwise determining that the second channel is not disturbed.

Preferably, the switch unit is also configured to detect whether the first channel is disturbed or whether the distance between the remote controller and the aircraft is larger than the distance threshold when the second channel receives the first control information and transmits the first control information to the aircraft; wherein if the first channel is not disturbed or the distance between the remote controller and the aircraft is no greater than the distance threshold, the first control information is received by the first channel and transmitted to the aircraft through switching, otherwise it is continued that the second channel receives the first control information and transmits the first control information to the aircraft.

In this solution, it is timely restored that the first channel receives and transmits the first control information.

Preferably, the first channel is a 2.4 G wifi (wireless fidelity) channel and the second channel is a 5.8 G wifi (a technique that allows an electronic device to connect to a wireless local area network) channel.

A remote control aircraft comprises:

the aircraft control device which is described according to any one of the above preferred conditions;

the remote controller configured to output the first control information; and the aircraft configured to receive the first control information through the first channel or the second channel.

Positive progress effects of the present invention are as follows. The present invention is able to switch the transmission route of the first control information between the first channel and the second channel in accordance with situations of the first channel and the second channel, so that the aircraft is always in a controlled state, so as to ensure the flight safety of the aircraft.

DETAILED DESCRIPTION OF THE PREFERRED EMBODIMENT

The present invention is further explained with embodiments as follows, but the present invention is not limited to the described embodiments.

Figure 1:
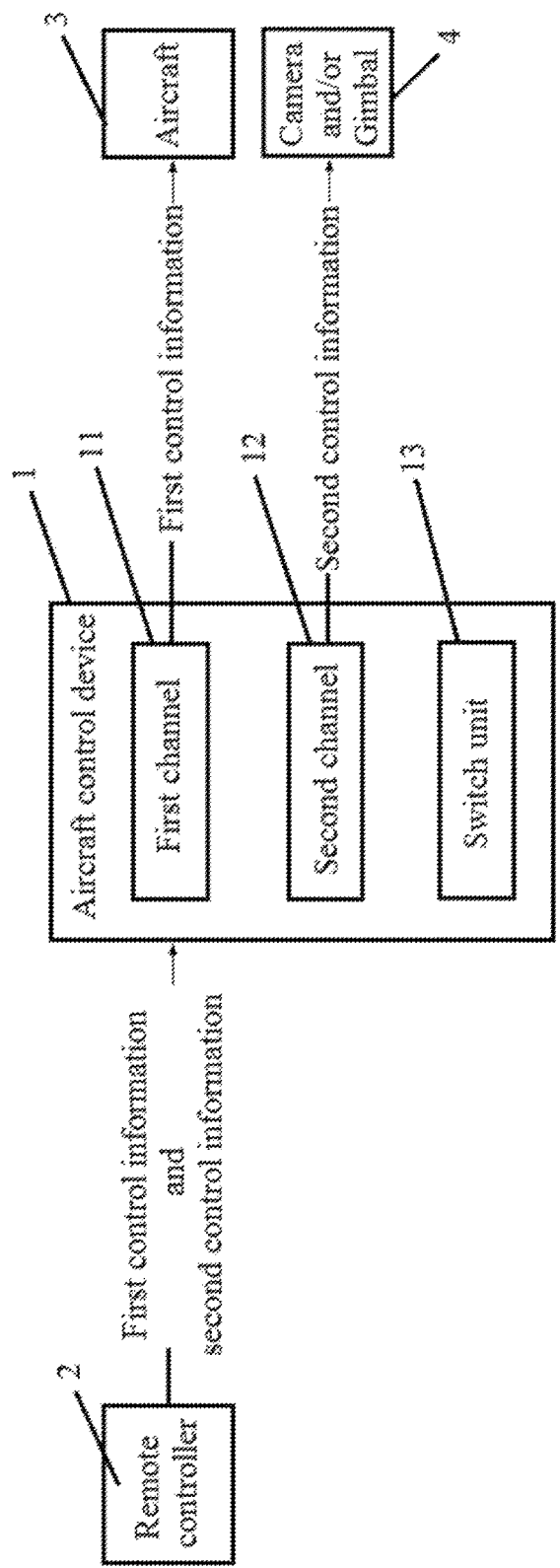
FIG. 1 is a transmission diagram of a first channel and a second channel of an aircraft control device by default according to a preferred embodiment of the present invention.
Figure 2:
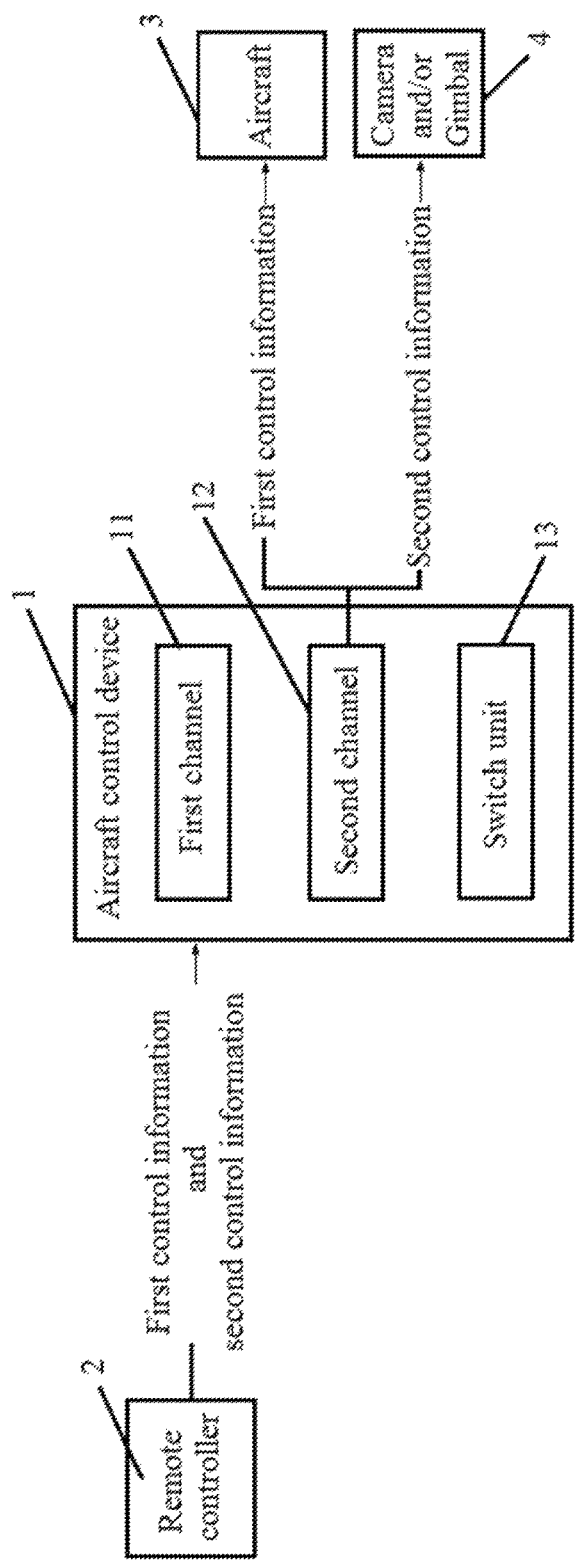
FIG. 2 is a transmission diagram of the first channel and the second channel after the aircraft control device is switched according to the preferred embodiment of the present invention.

Referring to FIGS. 1 and 2, an aircraft control device 1 comprises: a first channel 11, a second channel 12 and a switch unit 13. In this embodiment, the first channel 11 is a 2.4 G wifi (wireless fidelity) channel, and the second channel 12 is a 5.8 G wifi channel.

The first channel 11 is configured to receive first control information outputted by a remote controller 2 and transmit the first control information to an aircraft 3.

The second channel 12 is configured to receive second control information outputted by the remote controller 2 and transmit the second control information to a camera and/or a gimbal 4.

The switch unit 13 is configured to determine whether the first channel 11 is disturbed through judging an amount of the first control information received by the first channel 11 in a first time period, which is specifically as follows. If the amount of the first control information received by the first channel 11 in the first time period is smaller than a first amount threshold, it is determined that the first channel 11 is disturbed, otherwise it is determined that the first channel 11 is not disturbed. When the first channel 11 is disturbed, the first control information is received by the second channel 12 and transmitted to the aircraft 3 through switching. The first amount threshold is dependent on a transmission performance of the 2.4 G wifi channel, its specific values are not limited in the present embodiment, and are set by technicians themselves according to actual situations.

The switch unit 13 is also configured to continuously detect whether the first channel 11 is disturbed when the second channel 12 receives the first control information and transmits the first control information to the aircraft 3, wherein: if the first channel 11 is not disturbed, the first control information is received by the first channel 11 and transmitted to the aircraft 3 through switching, otherwise the first control information is continuously received by the second channel 12 and transmitted to the aircraft 3.

The switch unit 13 is also configured to detect a distance between the remote controller 2 and the aircraft 3 through a distance detection device. When the distance between the remote controller 2 and the aircraft 3 is larger than a distance threshold, the first control information is received by the second channel 12 and transmitted to the aircraft 3 through switching. The distance threshold is dependent on a transmission distance of the 2.4 G wifi channel, its specific values are not limited in the present embodiment, and are set by technicians themselves according to actual situations. The switch unit is also configured to continuously detect whether the distance between the remote controller 2 and the aircraft 3 is still larger than the distance threshold when the second channel 12 receives the first control information and transmits the first control information to the aircraft 3. If the distance between the remote controller 2 and the aircraft 3 is no greater than the distance threshold, the first control information is received by the first channel 11 and transmitted to the aircraft 3 through switching, and otherwise the first control information is continuously received by the second channel 12 and transmitted to the aircraft 3.

In the aircraft control device of the present embodiment by default, the first channel 11 transmits the first control information to the aircraft 3, the second channel 12 transmits the second control information to the camera and/or the gimbal 4, and however, when the first channel 11 is disturbed or the distance between the remote controller 2 and the aircraft 3 is larger than the distance threshold, a channel for transmitting the first control information is switched from the first channel 11 to the second channel 12 which is originally configured to transmit the second control information, thereby ensuring the effective transmission of the first control information.

When the first control information is received by the second channel 12 and transmitted to the aircraft 3 through switching, the second channel 12 has the transmission function of both the first control information and the second control information; the communication performance of the second channel 12 becomes particularly important. To prevent the second channel 12 from being disturbed to affect the control of the aircraft 3, the switch unit 13 is also configured to determine whether the second channel 12 is disturbed through judging an amount of the first control information received by the second channel 12 in a second time period, an amount of the second control information received by the second channel 12 in the second time period, or a total amount of the first control information and the second control information received by the second channel 12 in the second time period, which is specifically as follows. If the amount of the first control information received by the second channel 12 in the second time period, the amount of the second control information received by the second channel 12 in the second time period, or the total amount of the first control information and the second control information received by the second channel 12 in the second time period, is smaller than a second amount threshold, it is determined that the second channel 12 is disturbed, otherwise it is determined that the second channel 12 is not disturbed. The second amount threshold is dependent on a transmission performance of the 5.8 G wifi channel, its specific values are not limited in the present embodiment, and are set by technicians themselves according to actual situations.

The switch unit 13 is also configured to start an autonomous flight mode when the first control information is received by the second channel 12 and transmitted to the aircraft 3 through switching, and the second channel 12 is disturbed. The autonomous flight mode is configured to control the aircraft 3 to fly back to a takeoff point and land. During starting the autonomous flight mode, it is continuously detected whether the second channel 12 is disturbed; if the second channel 12 is disturbed, the autonomous flight mode is continued, otherwise it is restored that the first control information is received by the second channel 12 and transmitted to the aircraft 3.

The aircraft control device 1 of the present embodiment is able to switch the transmission route of the first control information between the first channel 11 and the second channel 12 in accordance with situations of the first channel 11 and the second channel 12, so that the aircraft 3 is always in a controlled state, to ensure the flight safety of the aircraft 3.

A UAV (unmanned aerial vehicle) of the present embodiment comprises the aircraft control device 1, the remote controller 2 and the aircraft 3.

The remote controller 2 is configured to output the first control information.

The aircraft 3 is configured to receive the first control information through the first channel 11 or the second channel 12.

In spite that the specific embodiments of the present invention have been described above, it will be understood by those skilled in the art that the embodiments are illustrative, and the protective scope of the present invention is defined by the appended claims. It will be apparent to those skilled in the art that various changes and modifications may be made to the embodiments without departing from the principles and spirit of the present invention, but these changes and modifications are within the protective scope of the present invention.

What is claimed is:

1. An aircraft control device, comprising:
   a first channel configured to receive first control information outputted by a remote controller and transmit the first control information to an aircraft;
   a second channel configured to receive second control information outputted by the remote controller and transmit the second control information to at least one of a camera and a gimbal; and
   a switch configured to switch that the first control information is received by the second channel and transmitted to the aircraft when the first channel is disturbed or a distance between the remote controller and the aircraft is larger than a distance threshold.

2. The aircraft control device, as recited in claim 1, wherein the switch is further configured to determine whether the first channel is disturbed through judging an amount of the first control information received by the first channel in a first time period.

3. The aircraft control device, as recited in claim 2, wherein determining whether the first channel is disturbed through judging the amount of the first control information received by the first channel in the first time period, comprises: if the amount of the first control information received by the first channel in the first time period is smaller than a first amount threshold, determining that the first channel is disturbed, otherwise determining that the first channel is not disturbed.

4. The aircraft control device, as recited in claim 1, wherein the switch is further configured to start an autonomous flight mode when the first control information is received by the second channel and transmitted to the aircraft through switching, and the second channel is disturbed; the autonomous flight mode is configured to control the aircraft to fly back to a takeoff point and land.

5. The aircraft control device, as recited in claim 4, wherein the switch is further configured to detect whether the second channel is disturbed during starting the autonomous flight mode; if the second channel is disturbed, the autonomous flight mode is continued, otherwise it is restored that the first control information is received by the second channel and transmitted to the aircraft.

6. The aircraft control device, as recited in claim 4, wherein the switch is further configured to determine whether the second channel is disturbed through judging an amount of the first control information received by the second channel in a second time period, an amount of the second control information received by the second channel in the second time period, or a total amount of the first control information and the second control information received by the second channel in the second time period.

7. The aircraft control device, as recited in claim 5, wherein the switch is further configured to determine whether the second channel is disturbed through judging an amount of the first control information received by the second channel in a second time period, an amount of the second control information received by the second channel in the second time period, or a total amount of the first control information and the second control information received by the second channel in the second time period.

8. The aircraft control device, as recited in claim 6, wherein determining whether the second channel is disturbed through judging the amount of the first control information received by the second channel in the second time period, the amount of the second control information received by the second channel in the second time period, or the total amount of the first control information and the second control information received by the second channel in the second time period, comprises:
   if the amount of the first control information received by the second channel in the second time period, the amount of the second control information received by the second channel in the second time period, or the total amount of the first control information and the second control information received by the second channel in the second time period, is smaller than a second amount threshold, determining that the second channel is disturbed, otherwise determining that the second channel is not disturbed.

9. The aircraft control device, as recited in claim 7, wherein determining whether the second channel is disturbed through judging the amount of the first control information received by the second channel in the second time period, the amount of the second control information received by the second channel in the second time period, or the total amount of the first control information and the second control information received by the second channel in the second time period, comprises:
   if the amount of the first control information received by the second channel in the second time period, the amount of the second control information received by the second channel in the second time period, or the total amount of the first control information and the second control information received by the second channel in the second time period, is smaller than a second amount threshold, determining that the second channel is disturbed, otherwise determining that the second channel is not disturbed.

10. The aircraft control device, as recited in claim 1, wherein the switch is further configured to detect whether the first channel is disturbed or whether the distance between the remote controller and the aircraft is larger than the distance threshold when the second channel receives the first control information and transmit the first control information to the aircraft; if the first channel is not disturbed or the distance between the remote controller and the aircraft is no greater than the distance threshold, the first control information is received by the first channel and transmitted to the aircraft through switching, otherwise it is continued that the second channel receives the first control information and transmits the first control information to the aircraft.

11. The aircraft control device, as recited in claim 5, wherein the switch is further configured to detect whether the first channel is disturbed or whether the distance between the remote controller and the aircraft is larger than the distance threshold when the second channel receives the first control information and transmit the first control information to the aircraft; if the first channel is not disturbed or the distance between the remote controller and the aircraft is no greater than the distance threshold, the first control information is received by the first channel and transmitted to the aircraft through switching, otherwise it is continued that the second channel receives the first control information and transmits the first control information to the aircraft.

12. The aircraft control device, as recited in claim 1, wherein the first channel is a 2.4 G wifi (wireless fidelity) channel and the second channel is a 5.8 G wifi channel.

13. A remote control aircraft, comprising:
an aircraft control device, comprising:
a first channel configured to receive first control information outputted by a remote controller and transmit the first control information to an aircraft;
a second channel configured to receive second control information outputted by the remote controller and transmit the second control information to at least one of a camera and a gimbal; and
a switch configured to switch that the first control information is received by the second channel and transmitted to the aircraft when the first channel is disturbed or a distance between the remote controller and the aircraft is larger than a distance threshold;
the remote controller configured to output the first control information; and
the aircraft configured to receive the first control information through the first channel or the second channel.

14. The remote control aircraft, as recited in claim 13, wherein the switch is further configured to determine whether the first channel is disturbed through judging an amount of the first control information received by the first channel in a first time period.

15. The remote control aircraft, as recited in claim 14, wherein determining whether the first channel is disturbed through judging the amount of the first control information received by the first channel in the first time period, comprises: if the amount of the first control information received by the first channel in the first time period is smaller than a first amount threshold, determining that the first channel is disturbed, otherwise determining that the first channel is not disturbed.

16. The remote control aircraft, as recited in claim 13, wherein the switch is further configured to start an autonomous flight mode when the first control information is received by the second channel and transmitted to the aircraft through switching, and the second channel is disturbed; the autonomous flight mode is configured to control the aircraft to fly back to a takeoff point and land.

17. The remote control aircraft, as recited in claim 16, wherein the switch is further configured to detect whether the second channel is disturbed during starting the autonomous flight mode; if the second channel is disturbed, the autonomous flight mode is continued, otherwise it is restored that the first control information is received by the second channel and transmitted to the aircraft.

18. The remote control aircraft, as recited in claim 17, wherein the switch is further configured to determine whether the second channel is disturbed through judging an amount of the first control information received by the second channel in a second time period, an amount of the second control information received by the second channel in the second time period, or a total amount of the first control information and the second control information received by the second channel in the second time period.

19. The remote control aircraft, as recited in claim 18, wherein determining whether the second channel is disturbed through judging the amount of the first control information received by the second channel in the second time period, the amount of the second control information received by the second channel in the second time period, or the total amount of the first control information and the second control information received by the second channel in the second time period, comprises:
if the amount of the first control information received by the second channel in the second time period, the amount of the second control information received by the second channel in the second time period, or the total amount of the first control information and the second control information received by the second channel in the second time period, is smaller than a second amount threshold, determining that the second channel is disturbed, otherwise determining that the second channel is not disturbed.

20. The remote control aircraft, as recited in claim 13, wherein the switch is further configured to detect whether the first channel is disturbed or whether the distance between the remote controller and the aircraft is larger than the distance threshold when the second channel receives the first control information and transmit the first control information to the aircraft; if the first channel is not disturbed or the distance between the remote controller and the aircraft is no greater than the distance threshold, the first control information is received by the first channel and transmitted to the aircraft through switching, otherwise it is continued that the second channel receives the first control information and transmits the first control information to the aircraft.

* * * * *